(12) United States Patent
Matsuda et al.

(10) Patent No.: US 6,659,820 B2
(45) Date of Patent: Dec. 9, 2003

(54) JET-PROPULSION WATERCRAFT

(75) Inventors: Yoshimoto Matsuda, Kobe (JP); Atsufumi Ozaki, Kobe (JP); Yasuo Okada, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/202,558

(22) Filed: Jul. 23, 2002

(65) Prior Publication Data

US 2003/0027466 A1 Feb. 6, 2003

(30) Foreign Application Priority Data

Aug. 1, 2001 (JP) ......................................... 2001-233354

(51) Int. Cl.⁷ .............................................. B63H 21/32
(52) U.S. Cl. .................................... 440/89 B; 440/89 C
(58) Field of Search ............................ 440/89 R, 89 B, 440/89 C

(56) References Cited

U.S. PATENT DOCUMENTS

| | | | |
|---|---|---|---|
| 4,977,741 A | * 12/1990 | Lulloff et al. ................. | 60/310 |
| 5,251,439 A | * 10/1993 | Nakase et al. ................. | 60/310 |
| 6,461,208 B2 | * 10/2002 | Suzuki et al. ................. | 440/89 |

* cited by examiner

Primary Examiner—Stephen Avila
(74) Attorney, Agent, or Firm—Kolisch Hartwell, P.C.

(57) ABSTRACT

Disclosed is a jet-propulsion watercraft capable of maintaining cooling capability in an exhaust passage even when one cooling water passage is clogged with substances. The jet-propulsion watercraft comprises: an engine having a cooling water passage; an exhaust passage having a double-walled structure comprised of inner and outer walls between which a cooling water passage is at least partially formed; a water jet pump, the water jet pump pressurizing and accelerating water and ejecting the water from the outlet port, and supplying part of the water to the cooling water passages of the engine and the exhaust passage; a water-supply hole formed in the inner wall of the double-walled structure; a first cooling water passage for supplying the cooling water to the cooling water passage between the outer wall and the inner wall; and a bypass passage formed independently of the first cooling water passage.

5 Claims, 5 Drawing Sheets

JET-PROPULSION WATERCRAFT

BACKGROUND OF THE INVENTION

1. Field of the Invention

The present invention relates to a jet-propulsion watercraft including a personal watercraft (PWC) which ejects water rearward and planes on a water surface as the resulting reaction, and more particularly to a cooling water passage structure of the jet-propulsion watercraft.

2. Description of the Related Art

In recent years, so-called jet-propulsion personal watercraft have been widely used in leisure, sport, rescue activities, and the like. The personal watercraft is configured to have a water jet pump that pressurizes and accelerates water sucked from a water intake generally provided on a hull bottom surface and ejects it rearward from an outlet port. Thereby, the personal watercraft is propelled.

In the jet-propulsion personal watercraft, a steering nozzle provided behind the outlet port of the water jet pump is swung either to the right or to the left, to change the ejection direction of the water to the right or to the left, thereby turning the watercraft to the right or to the left.

In the personal watercraft, part of the water pressurized by the water jet pump is supplied as cooling water to a water jacket of the engine and components requiring cooling. That is, a so-called "direct cooling system" in which water outside the watercraft is directly supplied to the components requiring cooling, is employed.

The "direct cooling system" advantageously offers high cooling performance with a simple structure. In this system, however, unwanted substances are taken into the cooling water passage, together with the cooling water, because the water outside the watercraft is directly supplied to the cooling water passage. When the cooling water passage is clogged with the substances, its cooling capability is degraded. Especially when the cooling water passage to the exhaust passage connected to the engine is occluded by the substances, the cooling water is not supplied to an exhaust gas flowing through the inside of the exhaust passage through a "water-supply hole" provided in the exhaust passage, which leads to an increase in the temperature of the exhaust gas. Besides, rubber connecting components provided in the connected portion of the exhaust passage would be deteriorated.

Conventionally, for the purpose of detecting trouble in the cooling water passage, the cooling water passage is provided with a water-temperature sensor or the like.

SUMMARY OF THE INVENTION

The present invention addresses the above-described condition, and an object of the present invention is to provide a jet-propulsion watercraft capable of maintaining a cooling capability in an exhaust passage even when one cooling water passage to the exhaust passage is clogged with substances. Another object of the present invention is to provide a jet-propulsion watercraft having a cooling water passage structure capable of quickly eliminating substances in a cooling water passage formed in an exhaust passage.

According to the present invention, there is provided a jet-propulsion watercraft comprising: an engine having a cooling water passage inside thereof; an exhaust passage extending from the engine and having a double-walled structure comprised of inner and outer walls between which a cooling water passage is at least partially formed, for discharging an exhaust gas; a water jet pump driven by the engine, the water jet pump pressurizing and accelerating water taken in from outside of the watercraft and ejecting the water from an outlet port to propel the watercraft as a reaction of the ejecting water, and supplying part of the water to the cooling water passage of the engine and the cooling water passage of the exhaust passage; a water-supply hole formed in the inner wall of the double-walled structure, for supplying the water into an exhaust gas passage in the exhaust passage; a first cooling water passage for supplying the cooling water to the cooling water passage between the outer wall and the inner wall of the double-walled structure; and a bypass passage formed independently of the first cooling water passage, for supplying the cooling water to the cooling water passage between the outer wall and the inner wall.

In the jet-propulsion watercraft so constituted, when either the first cooling water passage or the bypass passage is clogged with substances, the cooling capability of the exhaust passage can be maintained because the cooling water is supplied to the exhaust passage through the remaining one. As a result, regardless of clogging in the first cooling water passage or the bypass passage, the temperature and noise of the exhaust gas can be reduced. Therefore, a rubber connecting component used in a connected portion of the exhaust passage is not deteriorated.

In the jet-propulsion watercraft, the bypass passage may be connected to the cooling water passage between the outer wall and the inner wall of the double-walled structure through a connecting hole provided in the outer wall, and the water-supply hole through which the water is supplied into the exhaust gas passage may be formed in the inner wall which can be reached by a drill through the connecting hole such that a diameter of the water-supply hole is smaller than a diameter of the connecting hole. Thereby, even when the water-supply hole is clogged with substances, such substances can be easily eliminated through the connecting hole. Besides, the water-supply hole can be easily formed by utilizing the connecting hole.

In the jet-propulsion watercraft, the water-supply hole may be concentric with the connecting hole. Thereby, by using one drill with a small-diameter drill protruding from a large-diameter drill, i.e., a core drill with center drill, two holes can be simultaneously formed by one drilling operation. This improves productivity.

In the jet-propulsion watercraft, the connecting hole may be a taper hole, a female screw may be provided on an inner peripheral face of the taper hole, and a male screw may be provided at a tip end of a pipe constituting the bypass passage so as to be threadedly engaged with the female screw. This achieves tight liquid sealing in the connecting structure.

In the jet-propulsion watercraft, a tip end portion of the bypass passage may be bent to be L-shaped and a tip end of the L-shaped tip end portion may be connected to the connecting hole, and a penetrating hole may be formed to extend from a first face of the tip end of the L-shaped tip end portion to a second face of a bent portion of the L-shaped tip end portion, the second face being opposed to the first face, and a cap member may be removably screwed to the penetrating hole opened in the second face. Thereby, the mere removal of the cap member from the penetrating hole enables the water-supply hole to be inspected and the substances clogging the water-supply hole to be eliminated. Preferably, the cap member is provided with a transparent inspection port.

The above and further objects and features of the invention will more fully be apparent from the following detailed description with accompanying drawings.

DETAILED DESCRIPTION OF THE PREFERRED EMBODIMENTS

Hereinafter, a personal watercraft which is one type of jet-propulsion watercraft according to an embodiment of the present invention will be described with reference to the accompanying drawings.

Figure 5:
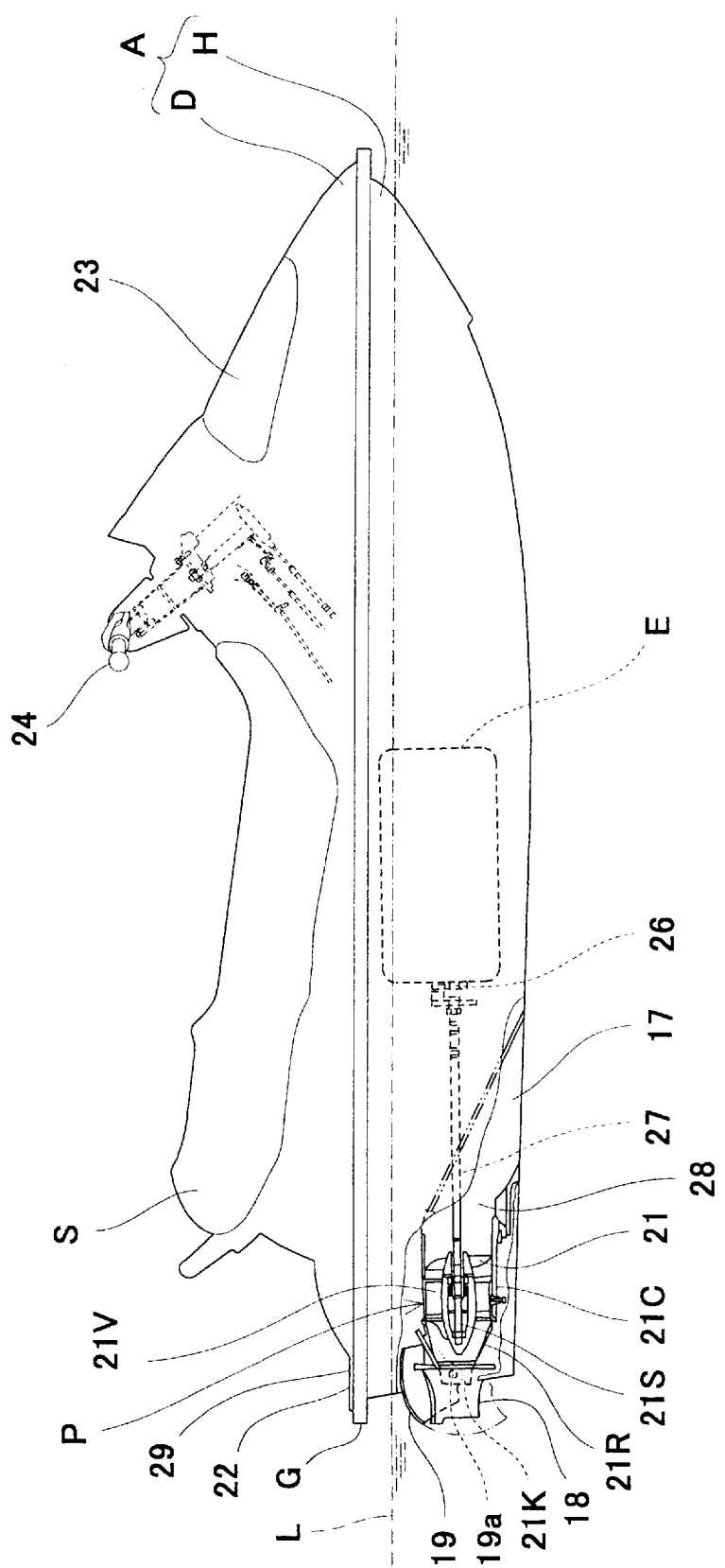
FIG. 5 is a side view of a jet-propulsion personal watercraft according to the embodiment of the present invention.
Figure 6:
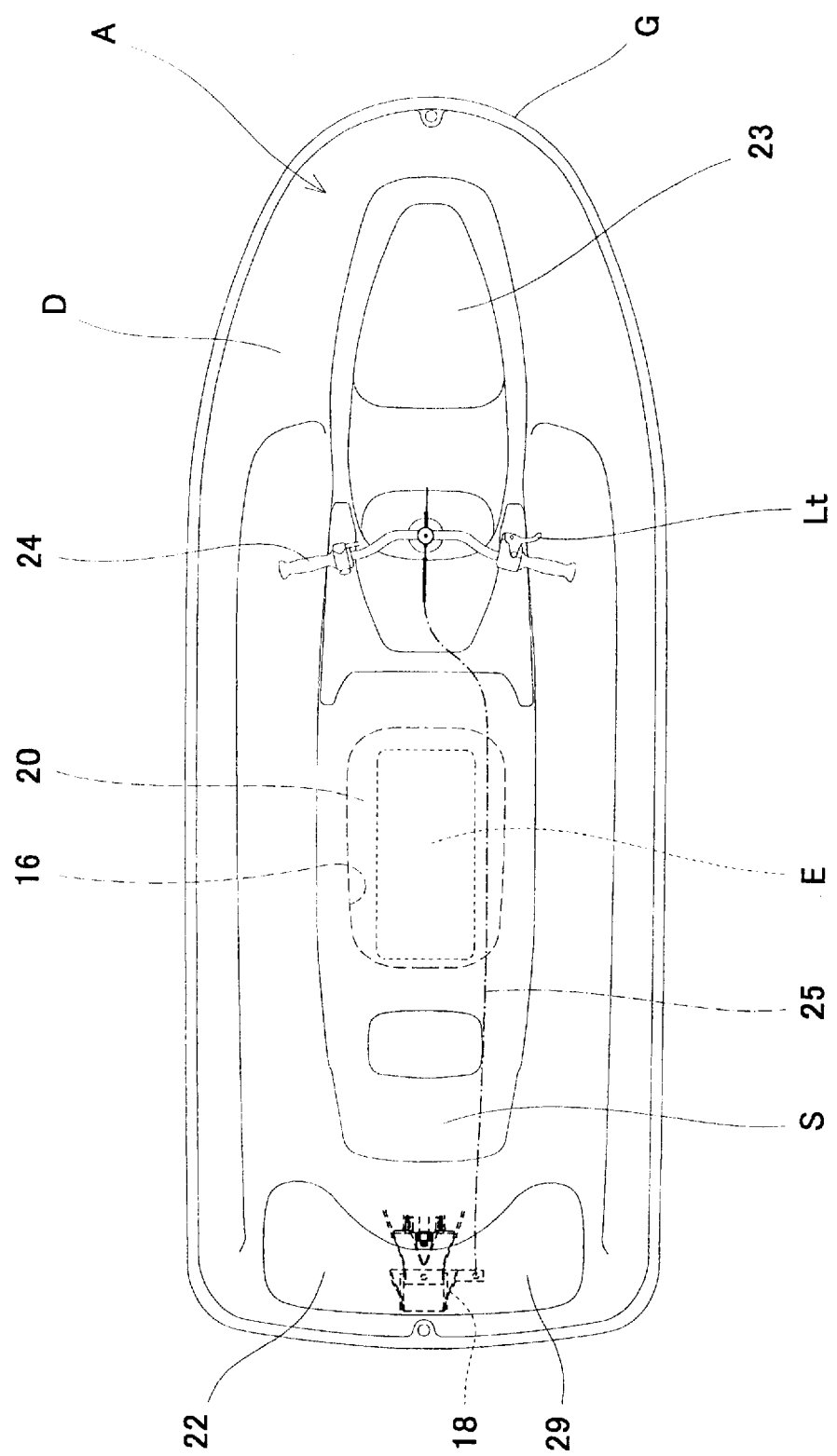
FIG. 6 is a plan view showing the personal watercraft in FIG. 5.

In FIGS. 5, 6, reference numeral A denotes a body of the personal watercraft. The body A comprises a hull H and a deck D covering the hull H from above. A line at which the hull H and the deck D are connected over the entire perimeter thereof is called a gunnel line G. In this embodiment, the gunnel line G is located above a waterline L of the personal watercraft.

As shown in FIG. 6, an opening 16, which has a substantially rectangular shape seen from above, is formed at a relatively rear section of the deck D such that it extends in the longitudinal direction of the body A. As shown in FIGS. 5, 6, a riding seat S is provided over the opening 16.

An engine E is provided in a chamber (engine room) 20 surrounded by the hull H and the deck D below the seat S.

The engine E is a two-cycle engine having water-cooled multiple cylinders (e.g., three cylinders). As shown in FIG. 5, a crankshaft 26 of the engine E is mounted along the longitudinal direction of the body A. An output end of the crankshaft 26 is rotatably coupled integrally with a pump shaft 21S of a water jet pump P through a propeller shaft 27. An impeller 21 is attached on the pump shaft 21S of the water jet pump P. The impeller 21 is covered with a pump casing 21C on the outer periphery thereof. A water intake 17 is provided on the bottom of the hull H. The water is sucked from the water intake 17 and fed to the water jet pump P through a water intake passage 28. The water jet pump P pressurizes and accelerates the water by rotation of the impeller 21. The pressurized and accelerated water is discharged through a pump nozzle 21R having a cross-sectional area of flow gradually reduced rearward, and from an outlet port 21K provided on the rear end of the pump nozzle 21R, thereby obtaining a propulsion force.

In FIG. 5, reference numeral 21V denotes fairing vanes for fairing water flow behind the impeller 21. In FIGS. 5, 6, reference numeral 24 denotes a bar-type steering handle. The handle 24 operates in association with a steering nozzle 18 swingable around a swing shaft (not shown) to the right or to the left behind the pump nozzle 21R. When the rider rotates the handle 24 clockwise or counterclockwise, the steering nozzle 18 is swung toward the opposite direction so that the watercraft can be correspondingly turned to any desired direction while the water jet pump P is generating the propulsion force. As shown in FIG. 6, the handle 24 is provided with a throttle lever Lt for controlling an engine speed of the engine E in the vicinity of a right grip.

As shown in FIG. 5, a bowl-shaped reverse deflector 19 is provided above the rear side of the steering nozzle 18 such that it can swing downward around a horizontally mounted swinging shaft 19a. The deflector 19 is swung downward to a lower position behind the steering nozzle 18 to deflect the ejected water from the steering nozzle 18 forward, and as the resulting reaction, the personal watercraft moves rearward.

In FIGS. 5, 6, reference numeral 22 denotes a rear deck. The rear deck 22 is provided with an openable rear hatch cover 29. A rear compartment (not shown) with a small capacity is provided under the rear hatch cover 29. In FIG. 5 or 6, reference numeral 23 denotes a front hatch cover. A front compartment (not shown) is provided under the front hatch cover 23 for storing equipments and the like.

Figure 1:
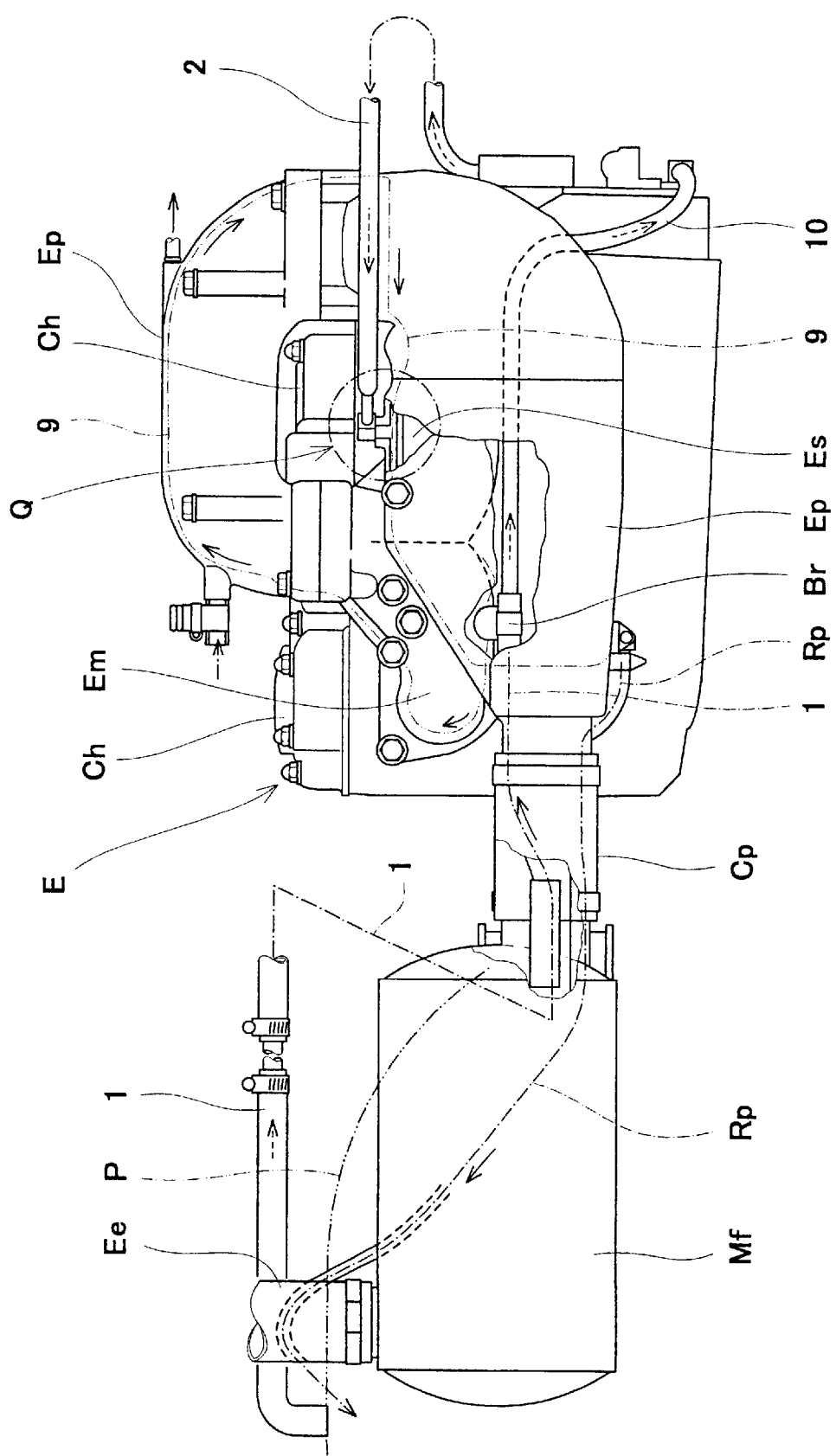
FIG. 1 is a partially cutaway side view showing a cooling water passage system of an engine and an exhaust passage of a personal watercraft according to an embodiment of the present invention.
Figure 2:
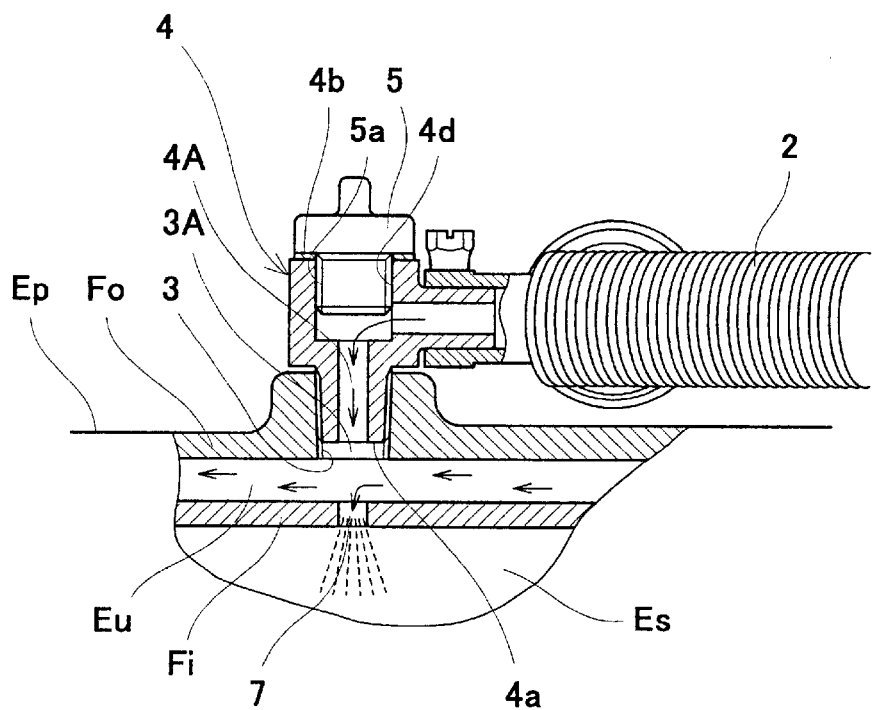
FIG. 2 is a partially enlarged cross-sectional view of a portion where a bypass passage is connected to a cooling water passage between an outer wall and an inner wall of the exhaust passage having a double-walled structure, according to the embodiment of the present invention.

The personal watercraft according to the embodiment of the present invention has a cooling water passage system as shown in FIGS. 1, 2. Referring to FIG. 1, the cooling water outside the watercraft flows through a cooling water supply passage 1 from a positive-pressure region of a water-flow portion of the water jet pump P (see FIG. 5), i.e., rear flow region of the impeller (not shown), and is then divided so as to flow through a first cooling water passage 9 and a bypass passage 2 independent of the first cooling water passage 9. Then, the divided cooling water is gathered to a double-walled (e.g., double-pipe) portion formed in an exhaust pipe Ep as an exhaust passage to which the cooling water is supplied. The exhaust pipe Ep is connected to the engine E through an exhaust manifold Em at a position upstream in an exhaust gas flow path and to a water muffler Mf through a rubber connecting pipe Cp at a position downstream in the exhaust gas flow path.

The first cooling water passage 9 branches from the cooling water supply passage 1 at a branch portion Br and leads to a cooling water passage of an exhaust manifold Em of the engine E and a cooling water passage of a cylinder head Ch of the engine E, and further to the double-walled portion of the exhaust pipe Ep.

Meanwhile, the bypass passage 2 branches from the cooling water supply passage 1 at the branch portion Br and leads to a cooling water passage of a generator and a cooling water passage of auxiliary equipment through a cooling water passage 10 constituting the bypass passage 2, and part of the bypass passage 2 leads to the double-walled portion of the exhaust pipe Ep. In brief, the cooling water supplied from the cooling water supply passage 1 is divided to flow through the first cooling water passage 9 and the bypass passage 2.

Referring to FIG. 2, the exhaust pipe Ep has the double-walled structure comprised of an outer wall Fo and an inner wall Fi, between which a cooling water passage Eu is formed, and an exhaust gas passage Es formed inside the inner wall Fi. The cooling water is supplied from the cooling water passage of the exhaust manifold Em and the cooling water passage of the cylinder head Ch, to the cooling water passage Eu in the exhaust pipe Ep.

The outer wall Fo has a connecting hole portion 3 provided with a taper screw (female screw) on the inner peripheral face thereof.

A L-shaped pipe 4 provided with a taper screw (male screw) on the outer periphery thereof is screwed to a hole (connecting hole) 3A of the connecting hole portion 3.

The bypass passage 2 is connected to the exhaust pipe Ep through the L-shaped pipe 4 to allow the cooling water to flow from the bypass passage 2 to the cooling water passage Eu of the exhaust pipe Ep. The cooling water is also supplied from the bypass passage 2 to the cooling water passage Eu.

The L-shaped pipe 4 is also provided with a penetrating hole 4A extending from a first face 4a of the tip of the L-shaped pipe 4, which is located in the connecting hole 3A, to a second face 4b of a bent portion of the L-shaped pipe 4, which is opposed to the first face 4a. In this embodiment, the penetrating hole 4A is a stepped hole having a diameter larger in the second face 4b than in the first face 4a. This large-diameter portion is provided with a female screw 4d. A cap member 5 having a male screw 5a screwed to the female screw 4d is removably attached to the penetrating hole 4A.

A water-supply hole 7 is formed in the inner wall Fi of the exhaust pipe Ep such that the water-supply hole 7 is concentric with the connecting hole 3A and opened from the cooling water passage Eu toward the exhaust gas passage Es. The hole diameter of the water-supply hole 7 is smaller than the hole diameter of the connecting hole 3A.

In FIG. 1, Ee denotes an exhaust end pipe extending from the water muffler M to the outside the watercraft and Rp denotes a discharge passage of the cooling water from the exhaust pipe Ep.

The personal watercraft having the above-identified cooling water passage system functions as follows. When the engine E of the watercraft is running, the water jet pump P is rotated by the engine E. By rotation of the water jet pump P, the cooling water is supplied from the water jet pump P to the exhaust pipe Ep through the cooling water supply passage 1 and the first cooling water passage 9. The cooling water is also supplied from the bypass passage 2 to the exhaust pipe Ep through the L-shaped pipe 4.

Therefore, when either the first cooling water passage 9 or the bypass passage 2 is clogged with substances, the cooling water is supplied to the exhaust pipe Ep from the remaining one. This follows that the cooling water is supplied to the portion of the exhaust pipe Ep where the water-supply hole 7 is located, and is supplied into the exhaust gas passage Es inside the exhaust pipe Ep through the water-supply hole 7. As a result, the temperature and noise of the exhaust gas in the exhaust gas passage Es are reduced.

Even when the water-supply hole 7 of the exhaust pipe Ep is clogged with the substances in the cooling water, such substances can be easily eliminated by removing the cap member 5.

Preferably, the connecting hole 3A and the water-supply hole 7 are designed to be concentric with each other. This is because, in manufacture, these holes can be drilled by one drilling work using an annular cutter with center drill. The annular cutter is configured such that a small-diameter center drill protrudes from the center of a large-diameter core drill (annular cutter) having a number of blades on the periphery thereof. In brief, the water-supply hole 7 and the connecting hole portion 3 can be formed by one drilling operation. This greatly improves productivity.

Figure 3:
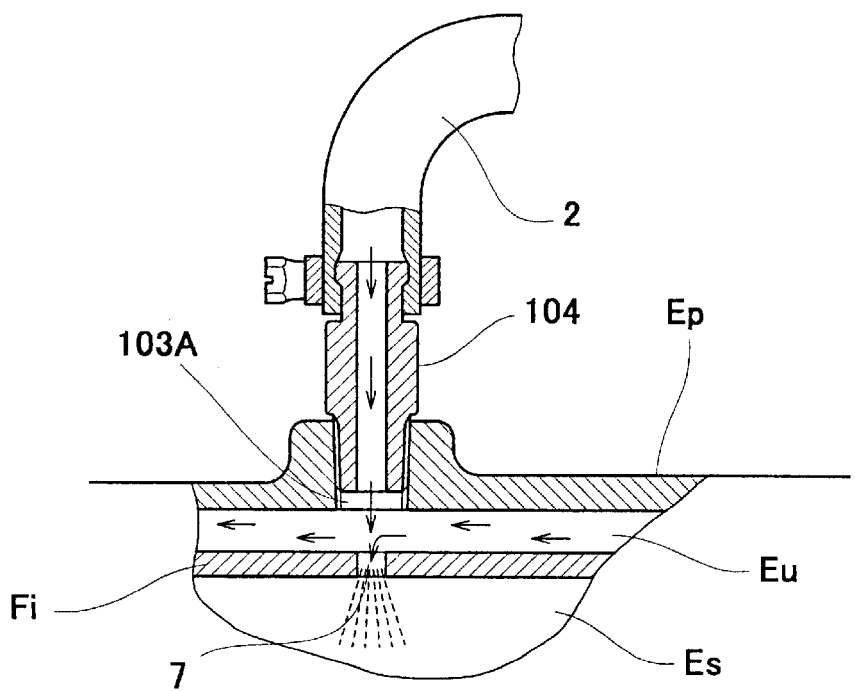
FIG. 3 is a partially enlarged cross-sectional view showing another structure of a portion where the bypass passage is connected to the cooling water passage between the outer wall and the inner wall of the exhaust passage having the double-walled structure, according to the embodiment of the present invention.

FIG. 3 shows a straight connecting pipe 104 as an alternative embodiment of the L-shaped pipe 4.

Figure 4:
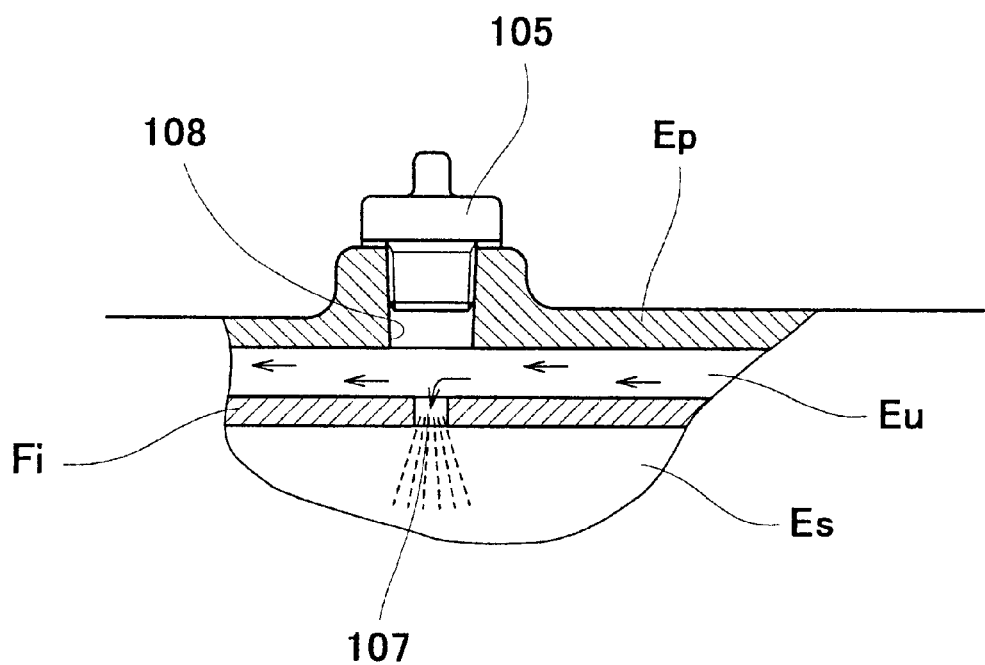
FIG. 4 is a partially enlarged cross-sectional view showing another structure of a cap member and a water-supply hole formed in the exhaust passage of the double-walled structure, according to the embodiment of the present invention.

In this case, also, as shown in FIG. 3, the water-supply hole 7 is concentric with the a connecting hole 103A formed in the exhaust pipe Ep. FIG. 4 shows a further alternative embodiment, in which an inspection port 108 is formed at a position of the exhaust pipe Ep which is different from the position where the connecting pipe 104 (see FIG. 3) is connected, in such a manner that the inspection port 108 is concentric with the water-supply hole 107 and has a diameter larger than that of the water-supply hole 107. A cap member 105 may be removably attached to the inspection port 108 by means of screws.

Similarly to the embodiment in FIG. 2, in the constitution of FIG. 4, even when the water-supply hole 107 is clogged with substances, the water-supply hole 107 can be easily inspected through the inspection port 108 and the substances can be eliminated, by removing the cap member 105. As a matter of course, in the embodiments in FIGS. 3, 4, when either the first cooling water passage 9 or the bypass passage 2 is clogged with substances, the cooling water is supplied from the inner wall (inner pipe) of the exhaust pipe Ep to the exhaust gas passage Es, thereby reducing the temperature and noise of the exhaust gas. Further, it is possible to increase durability of the rubber connecting components used where the exhaust pipe Ep is connected to the water muffler Mf located downstream of the exhaust pipe Ep in an exhaust gas flow path.

In the above-mentioned embodiments, the exhaust passage to which the cooling water is supplied is the exhaust pipe Ep. Alternatively, the exhaust passage may be the water muffler, or otherwise the connecting component (connecting pipe). When the cap members 5, 105 are entirely or partially transparent, inspection is easily carried out.

Further, the present invention is also applicable to jet-propulsion small watercraft other than the personal watercraft.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. A jet-propulsion watercraft comprising:
an engine having a cooling water passage inside thereof and cooled by cooling water;
an exhaust passage extending from the engine and having a double-walled structure comprised of inner and outer walls between which a cooling water passage is at least partially formed, for discharging an exhaust gas; a water jet pump driven by the engine, the water jet pump pressurizing and accelerating water taken in from outside of the watercraft and ejecting the water from an outlet port to propel the watercraft as a reaction of the ejecting water, and supplying part of the water to the cooling water passage of the engine and the cooling water passage of the exhaust passage;

a water-supply hole formed in the inner wall of the double-walled structure, for supplying the water into an exhaust gas passage in the exhaust passage;

a first cooling water passage for supplying the cooling water to the cooling water passage between the outer wall and the inner wall of the double-walled structure; and a bypass passage formed independently of the first cooling water passage, for supplying the cooling water to the cooling water passage between the outer wall and the inner wall.

2. The jet-propulsion watercraft according to claim 1, wherein the bypass passage is connected to the cooling water passage between the outer wall and the inner wall through a connecting hole provided in the outer wall and the water-supply hole is formed in the inner wall which can be reached by a drill through the connecting hole such that a diameter of the water-supply hole is smaller than a diameter of the connecting hole.

3. The jet-propulsion watercraft according to claim 2, wherein the water-supply hole is concentric with the connecting hole.

4. The jet-propulsion watercraft according to claim 2, wherein the connecting hole is a taper hole, and wherein a female screw is provided on an inner peripheral face of the taper hole, and a male screw is provided at a tip end of a pipe constituting the bypass passage so as to be threadedly engaged with the female screw.

5. The jet-propulsion watercraft according to claim 2, wherein a tip end portion of the bypass passage is bent to be L-shaped and a tip end of the L-shaped tip end portion is connected to the connecting hole, and wherein a penetrating hole is formed to extend from a first face of the tip end of the L-shaped tip end portion to a second face of a bent portion of the L-shaped tip end portion, the second face being opposed to the first face, and a cap member is removably screwed to the penetrating hole opened in the second face.

\* \* \* \* \*